United States Patent
Huang et al.

(10) Patent No.: US 9,651,993 B2
(45) Date of Patent: May 16, 2017

(54) DOCKING DEVICE (71) Applicant: Acer Incorporated, New Taipei (TW)

(72) Inventors: Yu-Chin Huang Huang, New Taipei (TW); Chih-Chun Liu, New Taipei (TW); Chien-Yun Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/194,301

(22) Filed: Jun. 27, 2016

(65) Prior Publication Data

US 2017/0017269 A1    Jan. 19, 2017

(30) Foreign Application Priority Data

Jul. 13, 2015    (TW) .............................. 104122485 A (51) Int. Cl.
*G06F 1/16*    (2006.01)
*E05C 1/10*    (2006.01)

(52) U.S. Cl.
CPC .................. *G06F 1/1632* (2013.01)

(58) Field of Classification Search
None
See application file for complete search history.

(56) References Cited

U.S. PATENT DOCUMENTS

| | | | |
|---|---|---|---|
| 8,300,389 B2 * | 10/2012 | Kang | H04M 1/0254 361/679.01 |
| 9,229,484 B2 * | 1/2016 | Chen | G06F 1/166 |
| 9,541,956 B2 * | 1/2017 | Chen | G06F 1/1632 |
| 2008/0024966 A1 | 1/2008 | Huang et al. | |
| 2012/0218722 A1 * | 8/2012 | Yu | F16M 11/041 361/747 |
| 2013/0155583 A1 * | 6/2013 | Yang | G06F 1/1626 361/679.01 |
| 2014/0092546 A1 * | 4/2014 | Senatori | G06F 1/203 361/679.31 |
| 2014/0153162 A1 * | 6/2014 | Kim | G06F 1/1616 361/679.01 |
| 2014/0285963 A1 * | 9/2014 | Vasilevsky | G06F 1/1632 361/679.43 |

(Continued)

FOREIGN PATENT DOCUMENTS

| | | |
|---|---|---|
| CN | 101470478 | 7/2009 |
| TW | 200841155 | 10/2008 |

(Continued)

*Primary Examiner* — Xanthia C Cunningham
(74) *Attorney, Agent, or Firm* — J.C. Patents (57) ABSTRACT A docking device used for attaching a portable electronic device thereon including a base, a lever, a button, and a locking member is provided. The lever pivoting in the base has a first end and a second end opposite to each other. The button and the locking member are movably disposed in the base respectively such that the button and the locking member are extruded out or hidden in the base respectively, wherein the button is located on a moving path of the first end, and the locking member is located on a moving path of the second end. When the portable electronic device is assembled to the docking device, the portable electronic device presses the button into the base to drive the first end, such that the second end drives the locking member out of the base to lock with the portable electronic device.

12 Claims, 8 Drawing Sheets

(56) References Cited

U.S. PATENT DOCUMENTS

| | | | | |
|---|---|---|---|---|
| 2015/0092333 A1* | 4/2015 | Kim | ............... | G06F 1/1632 361/679.17 |
| 2016/0062402 A1* | 3/2016 | Matsumoto | ........... | G06F 1/1632 361/679.43 |
| 2016/0105978 A1* | 4/2016 | Xu | ................ | F16B 2/12 248/220.22 |
| 2016/0292463 A1* | 10/2016 | Moore | ............... | E05B 73/0082 |
| 2016/0299534 A1* | 10/2016 | Wu | ................ | G06F 1/1626 |

FOREIGN PATENT DOCUMENTS

| | | |
|---|---|---|
| TW | M397130 | 1/2011 |
| TW | M419964 | 1/2012 |

\* cited by examiner

DOCKING DEVICE

CROSS-REFERENCE TO RELATED APPLICATION

This application claims the priority benefit of Taiwan application serial no. 104122485, filed on Jul. 13, 2015. The entirety of the above-mentioned patent application is hereby incorporated by reference herein and made a part of this specification.

BACKGROUND OF THE INVENTION

Field of the Invention

The invention relates to a docking device.

Description of Related Art

The biggest difference between portable computers and traditional desktop computers is that portable computers strive for miniaturization that provides user with the convenience of portability and operation in various environments. However, from another perspective, portable computers are also limited by their design requirement of small size and low weight, such that their function and expandability cannot be compared to that of desktop computers having more available room.

In view of this, prior art has proposed a docking device. When the user needs an apparatus that is not already a part of the portable computer, such as a keyboard or a disk, the user only needs to electrically assemble the portable computer to the docking device. As a result, the user not only can experience the light weight of the portable computer, but via the docking device, the user can also be saved of the trouble of having to plug/unplug the apparatus and at the same time enjoy the functions and the expandability of desktop computers.

However, current docking devices require extruded locking members for structural assembly, but extruded locking members aesthetically affect docking devices, and in extruded state render docking devices could be damaged easily. Therefore, making docking devices more aesthetically appealing and more durable and the improving the assemble-ability with portable computers are important issues.

SUMMARY OF THE INVENTION

Accordingly, the invention provides a docking device having a hidden locking member so that the docking device can be assembled to a portable electronic device.

The docking device of the invention is used for attaching a portable electronic device thereon. The docking device includes a base, a lever, a button, and a locking member. The lever is pivoted in the base and has a first end and a second end opposite to each other. The button and the locking member are movably disposed in the base respectively such that the button and the locking member are extruded out or hidden in the base respectively. The button is located on a moving path of the first end. The locking member is located on a moving path of the second end. When the portable electronic device is assembled to the docking device, the portable electronic device presses the button into the base to drive the first end, such that the second end drives the locking member out of the base to lock with the portable electronic device.

Based on the above, the docking device of the invention movably attaches the button and the locking member to the base, and drives the button and the locking member with the lever disposed in the base. Therefore, the button and the locking member are extruded out of or hidden in the base as the button and the locking member are driven by the lever. As a result, when the portable electronic device is assembled on the docking device, by pressing the button to drive the lever, the locking member is driven by the lever to be extruded out of the base and can be locked with the portable electronic device, thereby achieving the effect of structural attachment.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
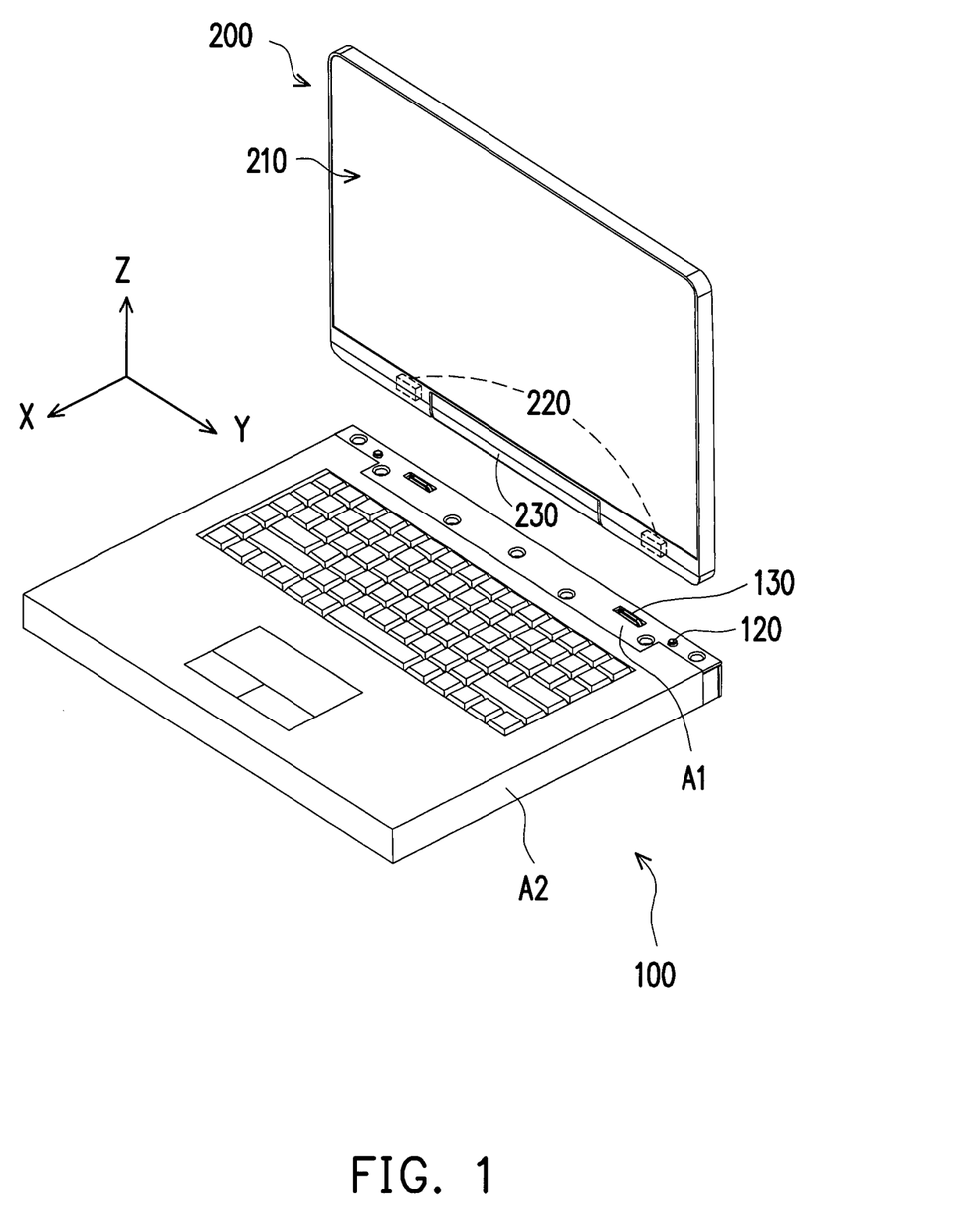
FIG. 1 is a diagram of an electronic assembly according to an embodiment of the invention.

FIG. 1 is a diagram of an electronic assembly according to an embodiment of the invention. Referring to FIG. 1, the electronic assembly of the embodiment includes a portable electronic device 200 and a docking device 100, wherein the portable electronic device 200 via loading and assembling to the docking device 100, in order to obtain additional functional operations. The keyboard and touch control panel disposed on the docking device 100 is an instance. However, the invention does not set a limit on the functions the docking device 100 can provide the portable electronic device 200.

In the embodiment, the portable electronic device 200 is assembled to and leans against a base A1 of the docking device 100, and the base A1 of the docking device 100 is capable of relative rotation about the Y-axis corresponding to a body A2 of the docking device 100 via a pivot module (not shown). However, the following mostly describe the structural connections between the base A1 and the portable electronic device 200. For other mechanism about the base A1 and the body A2 could be referred to current technology of the docking device 100 and will not be discussed here.

Figure 2:
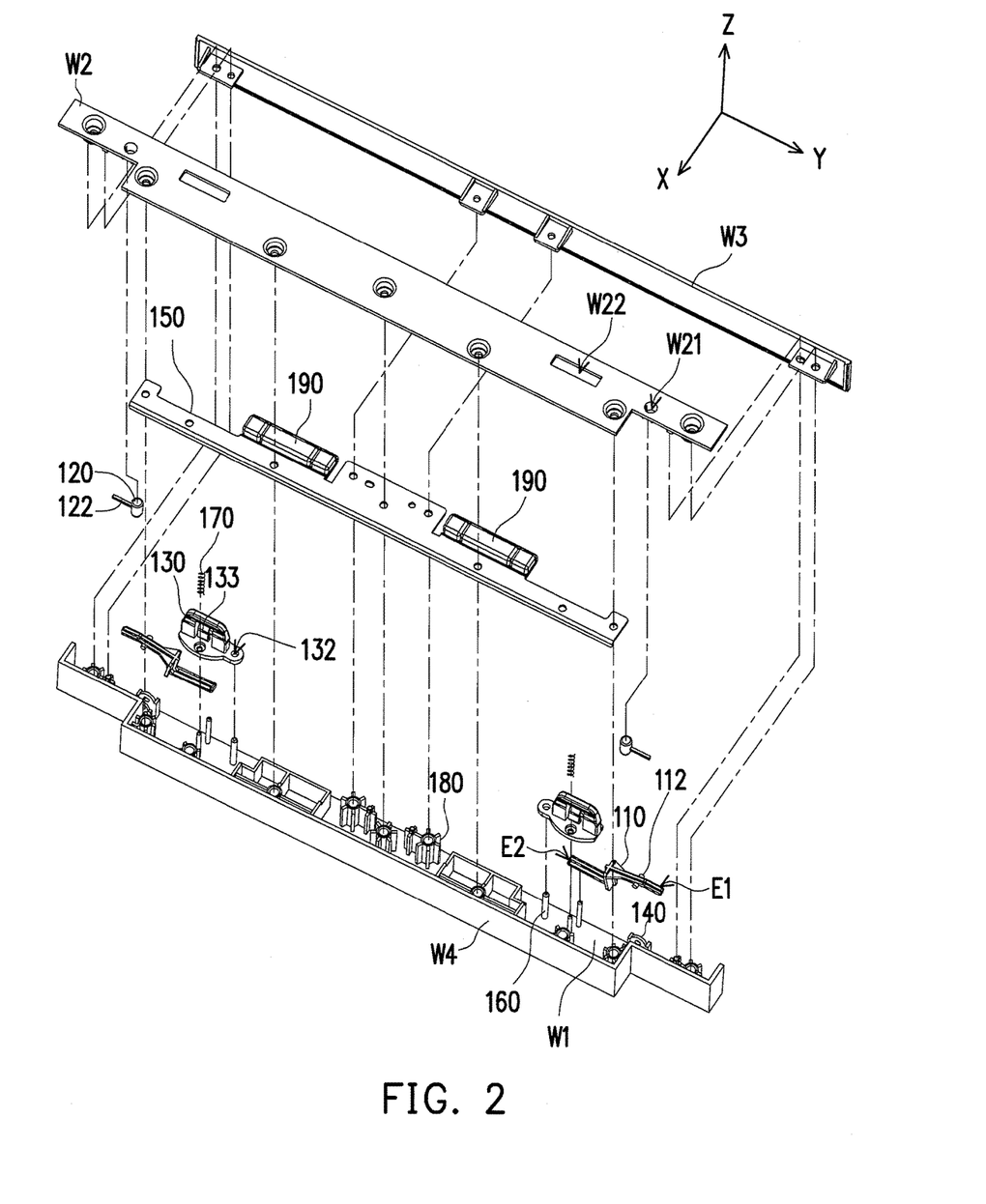
FIG. 2 and FIG. 3 are respectively exploded views of the docking device of FIG. 1 from different viewpoints.
Figure 3:
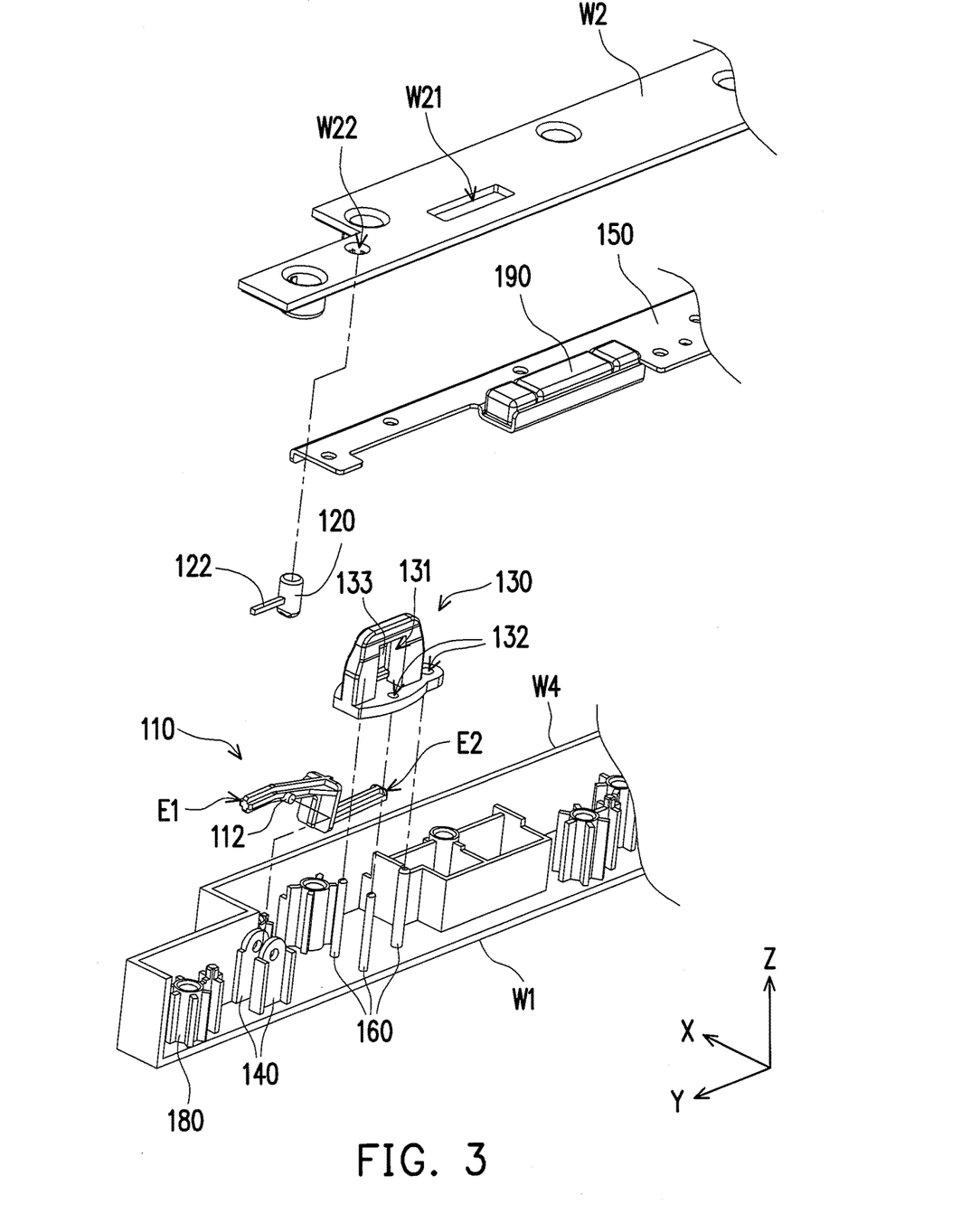

FIG. 2 and FIG. 3 are respectively exploded views of the docking device of FIG. 1 from different viewpoints, wherein the main description of the components focuses on the base A1. The locking accessories (shown by assembly lines) and some components are omitted. Referring to FIG. 1 and FIG. 3 of the embodiment, the docking device 100 further includes a lever 100, a button 120, and a locking member 130, wherein the lever 110 is pivoted in the base A1, and the button 120 and the locking member 130 are movably disposed in the base A1 so as to be extruded out of the base A1 or be hidden inside the base A1 respectively.

Figure 4:
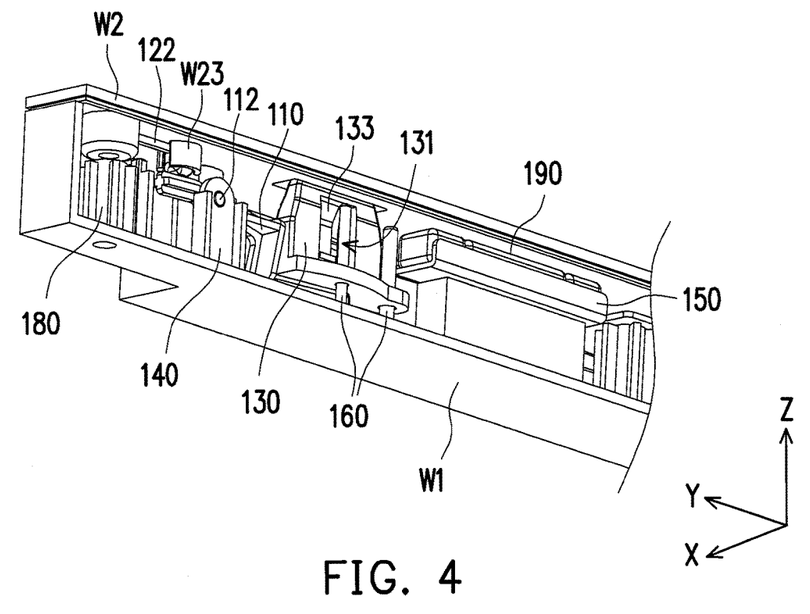
FIG. 4 and FIG. 5 are respectively exploded views of the base of FIG. 1 from different viewpoints.
Figure 5:
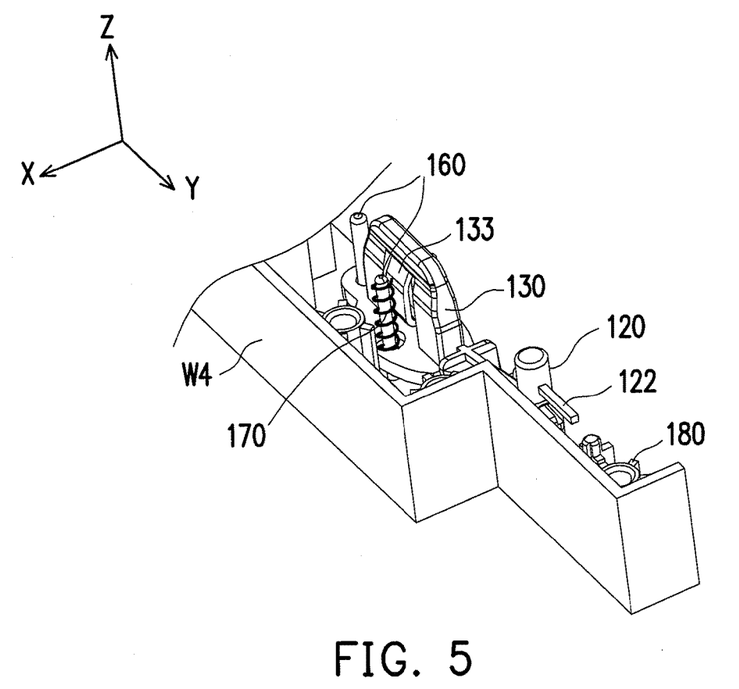

FIG. 4 and FIG. 5 are exploded views of the base of FIG. 1 from different viewpoints. Referring to FIG. 4 and FIG. 5 and compared with FIG. 1 to FIG. 3. First of all, as noted in FIG. 1 and FIG. 2, the combined structure of the embodiment disposed on the base A1 (including the portable electronic device 100 and a slot 220) are configured in symmetry; therefore, the portable electronic device 200 may be assembled to the base A1 facing the front or the back. As shown in FIG. 1, a display module 210 of the portable electronic device 200 faces the docking device 100 (i.e. positive X-axis direction). Similarly, in another embodiment (not shown), the portable electronic device 200 can be assembled to the base A1 with the back of the display module 210 facing the docking device 100 (i.e. facing negative X-axis). The following figures and descriptions relate to structures and components on one side for illustration without elaborating the other side.

More particularly, the base A1 includes a bottom plate W1, a roof plate W2, side plates W3 and W4 and related structures and components in the surrounding space after being assembled, i.e.: a first stand 140, a second stand 150, a guiding rod 160, and a spring 170, wherein the first stand 140 and the guiding rod 160 are disposed upright on the bottom plate W1, and as shown in the assembly lines in FIG. 2, the side plate W3 is integrated with the roof plate W2 and the bottom plate W1 after being locked onto a hollow pole 180 of the roof plate W2 and the bottom plate W1 via a locking accessory (not shown).

Next, the locking member 130 has a plurality of openings 132, and therefore is capable of working correspondingly with the guiding rod 160 via an opening 132, such that the locking member 130 moves along the Z-axis and reaches out from the base A1 or merges into the base A1 through an opening W21 of the roof plate W2. Furthermore, the roof plate W2 also has an opening W22 and a cylinder-shaped side wall W23 (shown in FIG. 4) which is extended from the peripheral of the opening W22 toward the bottom plate W1. The cylindrical button 120 is adapted to be slidably configured on the cylinder-shaped side wall W23. As a result, the button 120 is capable of reaching out of the base A1 or merging into the base A1 through the opening W22. In other words, the described guiding rod 160 provides a guide similar to that of a track and an effect of movement to the locking member 130.

Figure 6:
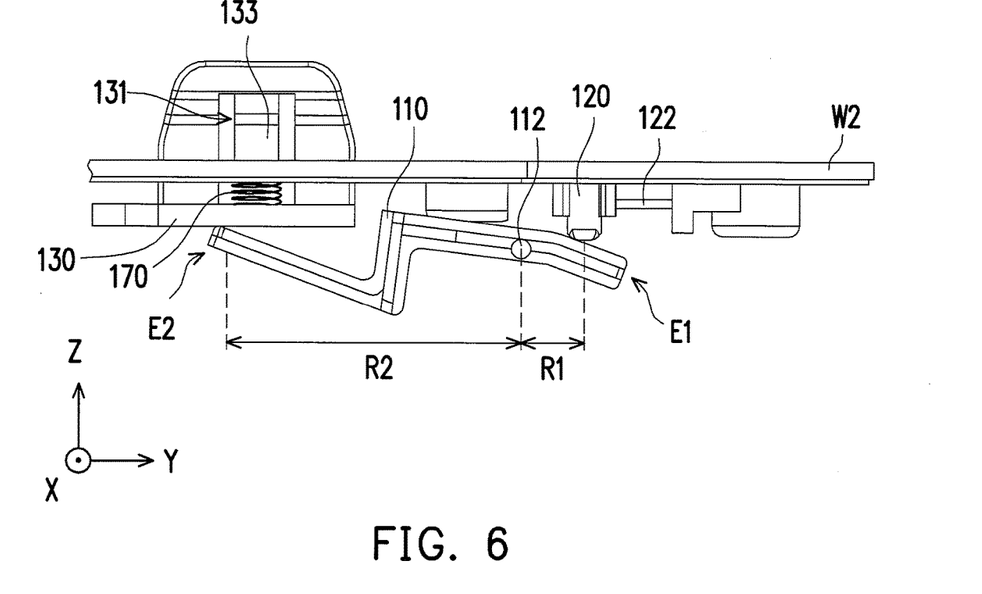
FIG. 6 is a diagram depicting some of the members of the docking device in one state.

FIG. 6 is a diagram showing some of the members of the docking device in one state, in which a portion of the locking member 130 is extruded out of the roof plate W2. Referring to FIG. 4 to FIG. 5, more importantly, when the lever 110 is pivotally connected to the first stand 140 via an axial part 112, the lever 110 can be pivoted on the X-axis, and the locking member 130 and the button 120 are respectively located on a moving path of a first end E1 and a moving path of a second end E2 of the lever 110. That is, the locking member 130 leans against the second end E2, and the button 120 leans against the first end E1. Based on this, when the lever 110 pivots on the X-axis, the lever 110 can push the button 120 to move with the first end E1, or push the locking member 130 to move with the second end E2.

Additionally, a spring 170 is sleeved on the guiding rod 160 and propped between the locking member 130 and the roof plate W1 (as shown in FIG. 5, and the guiding rod 160 is omitted in FIG. 6 to clearly identify the changes of the spring 170), and the spring 170 drives the locking member 130 to move toward the bottom plate W1. In other words, before the portable electronic device 200 is assembled to the docking device 100, the spring force of the spring 170 is used to maintain the locking member 130 in the base A1, thus causing the lever 110 to push the button 120 out and be extruded out of the roof plate W2. Once the user assembles the portable electronic device 200 to the base A1, the button 120 is pressed into the roof plate W2 via the weight of the portable electronic device 200 and force from the user in order to enter into the base A1, such that the lever 110 is pivoted and overcomes the spring force of the spring 170 (at this time the spring 170 is pressed) and pushes the locking member 130 out to be extruded out of the roof plate W2 (as shown in FIG. 6) Accordingly, the locking member 130 extruded from the base A1 is inserted into a slot 220 of the portable electronic device 200 (shown in FIG. 1) to achieve the effect of assembly. In contrast, once the portable electronic device 200 is removed from the docking device 100, the button 120 loses the above described force, and therefore the spring 170 is able to move the locking member 130 into the base A1 by a restoring force thereof, such that the button 120 is pushed by the lever 110 out of the base A1, and reverts back to the position before the locking member 130 is pushed out by the second end of the lever 110.

It needs to be noted that the button 120 of the embodiment, other than the cylindrical body, also includes a strip-shape stopping member 122 extended from the cylindrical body. When the button 120 is assembled to the roof plate W2, the cylindrical body moving along the Z-axis is slidably located in the cylinder-shaped side wall W23, and the strip-shape stopping member 122 is extended out from a hollow part of the cylinder-shaped side wall W23. When the button 120 is driven by the lever 110 to move back to the position as shown in FIG. 4, the strip-shape stopping member 122 interferes with the roof plate W2 to accordingly prevent the button 120 from falling off the roof plate W2.

Referring to FIG. 6, the locking member 130 further includes a hollow part 131 and an elastic arm 133 located in the hollow part 131. The elastic arm 133 is capable of being deformed along the X-axis; therefore, when the portable electronic device 200 and the docking device 100 are assembled together, the locking member 130 reaches into the slot 220 of the portable electronic device 200, the elastic arm 133 interferes with an inner wall of the slot 220, offering strength to the assembly between the portable electronic device 200 and the docking device 100. More specifically, in addition to being able to be assembled and secured as a result of its outer contour and size capable of causing structural interference to the slot 220 of the portable electronic device 200, the locking member 130 of the embodiment can increase security after assembly via the above described elastic arm 133.

On the other hand, regarding the respective relationship between the button 120, the lever 110, and the locking member 130, when designing the lever 110, after the path of the locking member 130 extruding from the roof plate W2 is confirmed, a first ratio exists between a lever arm R1 of the first end E1 of the lever 110 relative to a lever fulcrum (i.e. the pivot 112) and a lever arm R2 of the second end E2 relative to the lever fulcrum. Moreover, a second ratio exists between a path of the button 120 extending out of the base A1 and a path of the locking member extending from the base A1, and the first ratio matches the second ratio, such that the designer is able to obtain appropriate design parameters (i.e. pivot point, lever arm, etc.) of the lever 110 accordingly.

On the other hand, referring further to FIG. 1 and FIG. 2, in the embodiment, the docking device 100 further includes a plurality of magnetic members 190 disposed on the second stand 150 of the base A1 and located below the roof plate W2. When the portable electronic device 200 and the docking device 100 are assembled together, the magnetic members 190 are magnetically attracted to a side portion 230 of the portable electronic device 200, such that the portable electronic device 200 and the docking device 100 are securely assembled together. Furthermore, the magnetic attraction of the embodiment is substantially larger than the sum of the weight of the portable electronic device 200 and the required force when the button 120 is pressed, and accordingly the required structural support force can be provided to the portable electronic device 200 to securely dispose the portable electronic device 200 on the docking device 100, such that the portable electronic device 200 is not easily removed it from the docking device 100 by touching.

Figure 7:
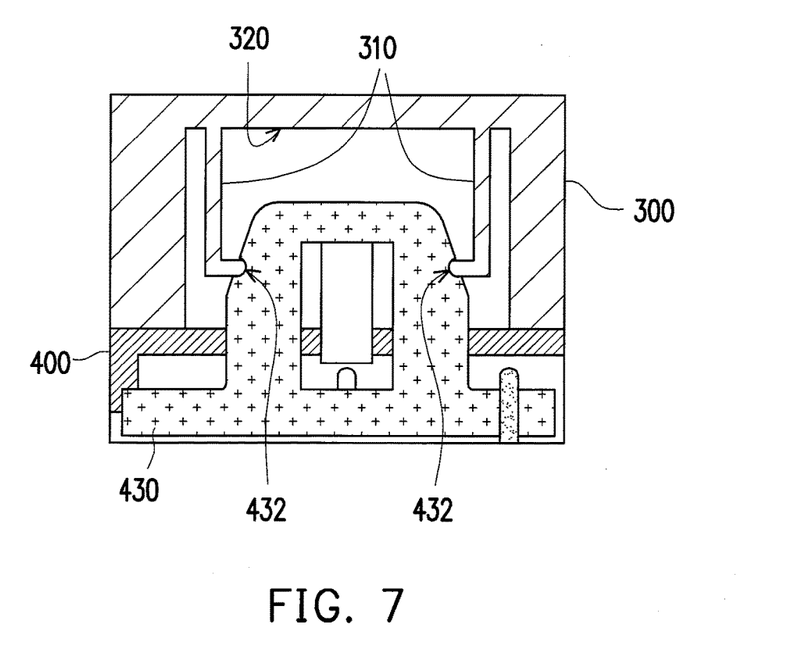
FIG. 7 is a diagram of a cross-sectional view of an electronic assembly according to an embodiment of the invention.

FIG. 7 is a diagram of a cross-sectional view of an electronic assembly according to another embodiment of the invention for showing a state of a locking point between a portable electronic device 300 and a docking device 400 when the two are locked. Referring to FIG. 7, the above described docking device 100 is locked with the docking device 100 based on the locking member 130 and the elastic arm 133. Differing from the previous embodiments, a locking member 430 of the docking device 400 in the present embodiment has a pair of locking recesses 432 at two sides thereof. Relatively, the portable electronic device 300 has a pair of elastic arms 310 located in a slot 320. When the portable electronic device 300 is assembled to the docking device 400, that is, after the locking member 430 is extended into the slot 320, the described locking recesses 432 are locked onto the elastic arm 310 in order to achieve the same effect of security as described in the previous embodiments.

Figure 8:
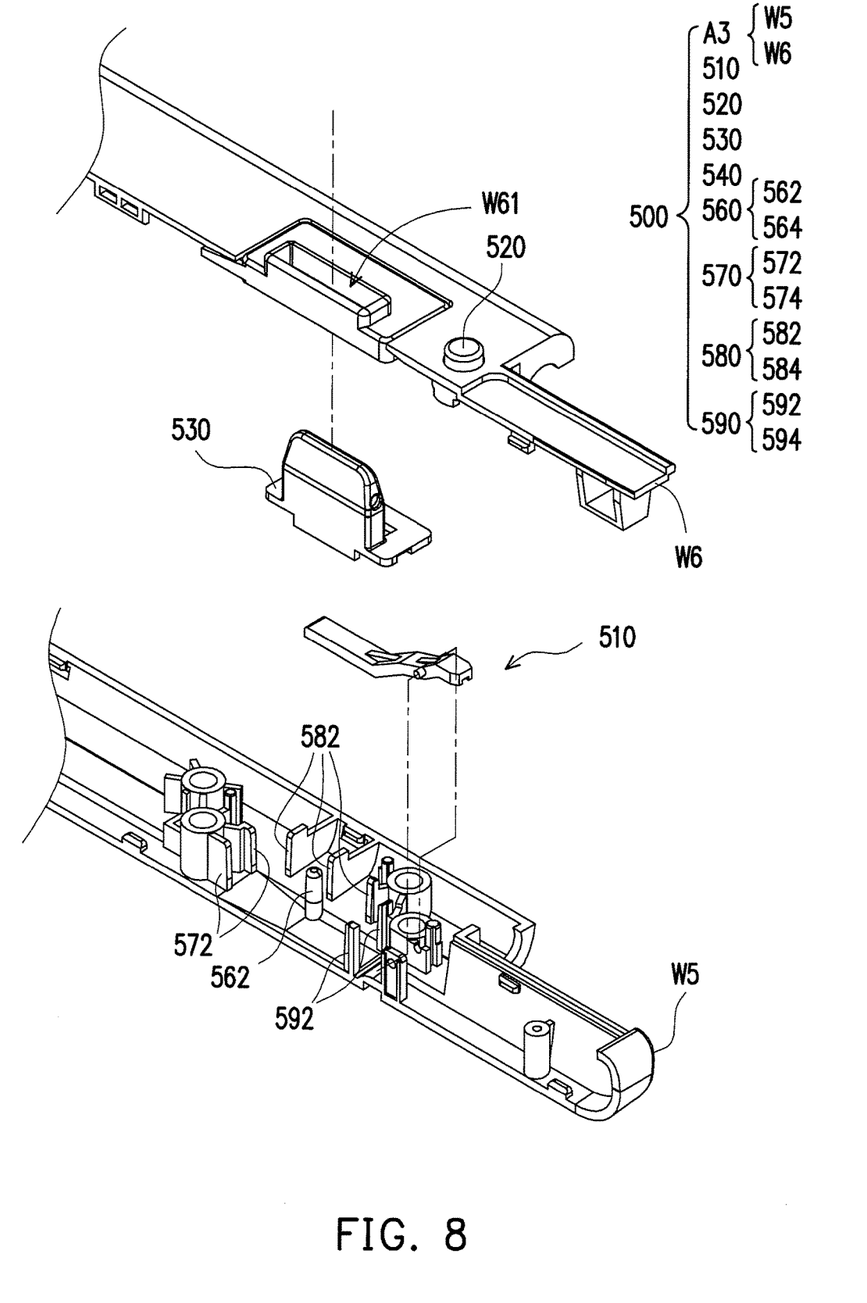
FIGS. 8 and 9 are respectively exploded views of a base from different viewpoints according to another embodiment of the invention.
Figure 9:
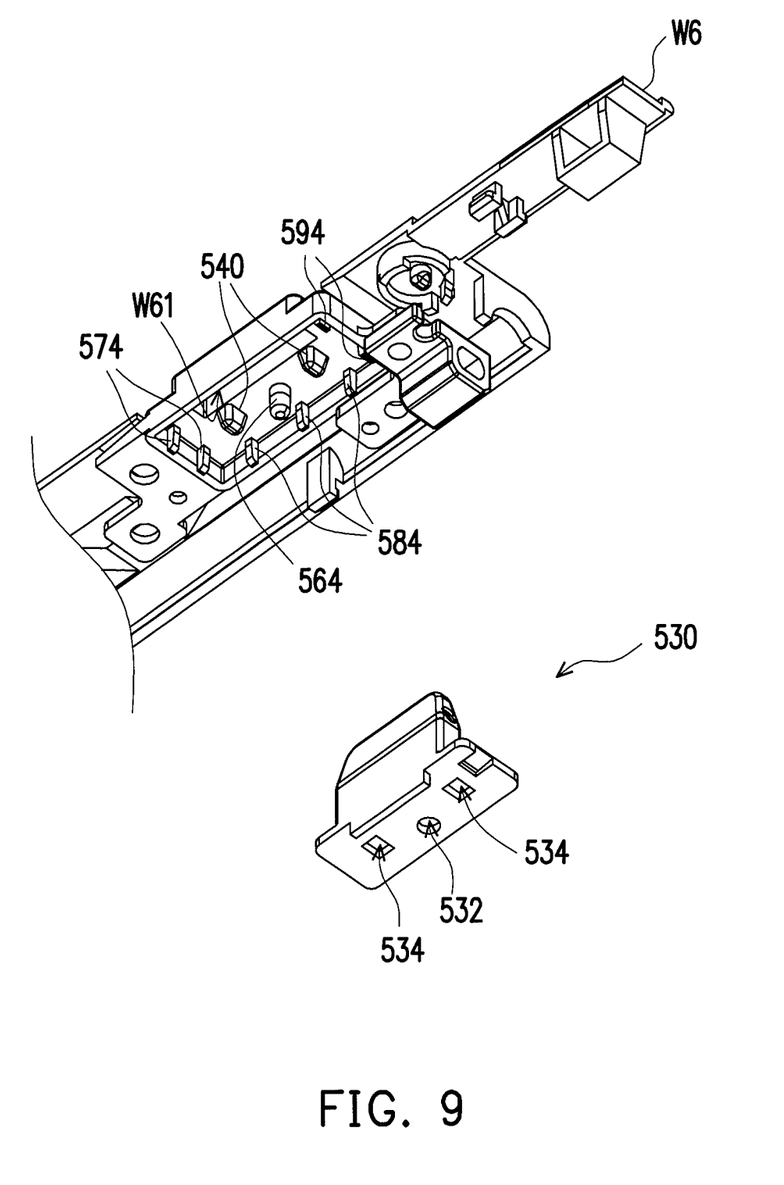
Figure 10:
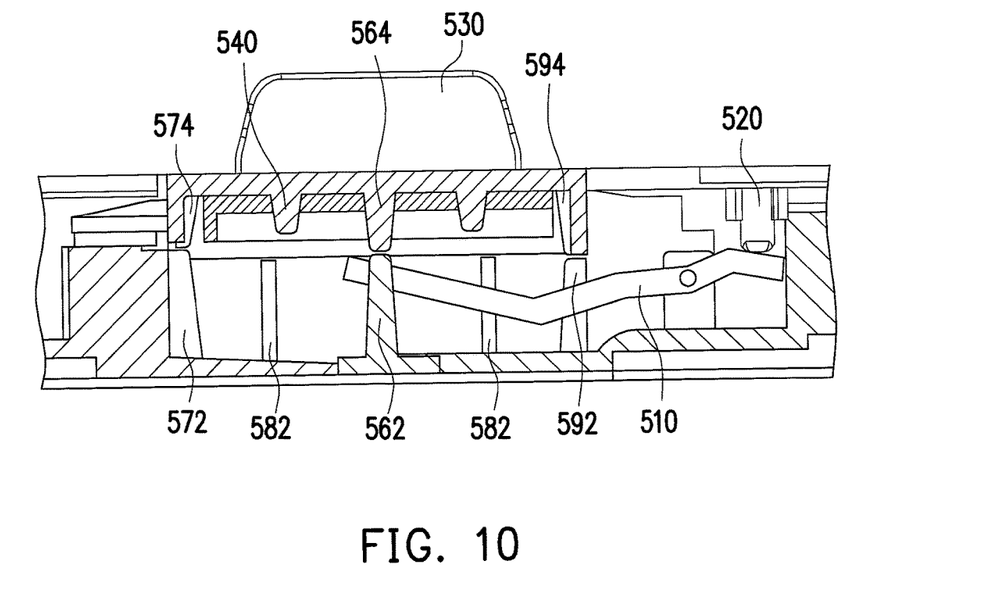
FIGS. 10 and 11 are diagrams of cross-sectional view in different states of FIG. 8.
Figure 11:
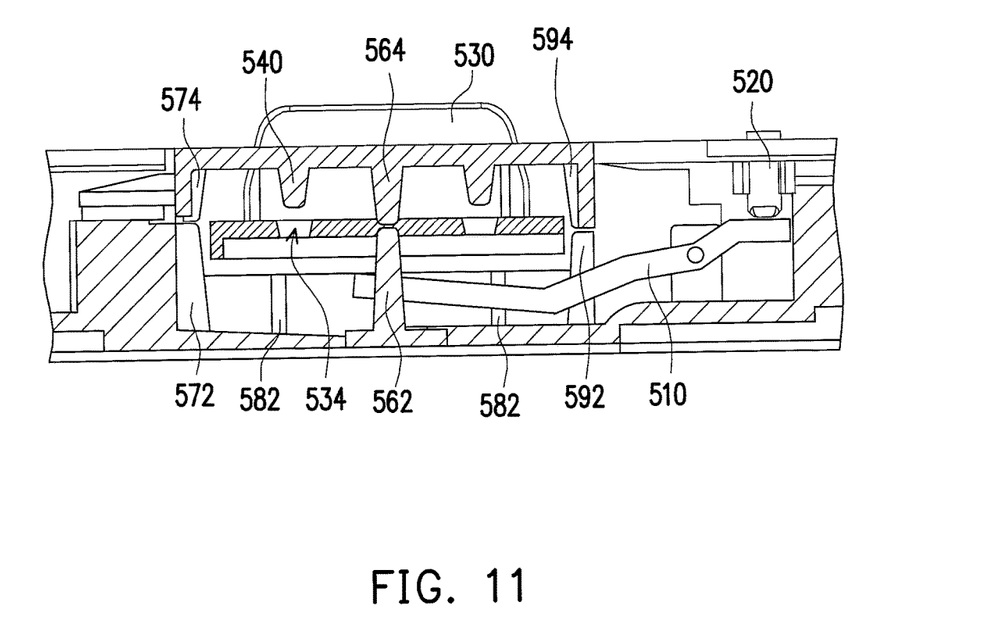

FIGS. 8 and 9 are respectively exploded views of a base from different viewpoints according to another embodiment of the invention. FIGS. 10 and 11 are diagrams of cross-sectional view in different states of FIG. 8. Referring to FIGS. 8 and 9 firstly, a base A3 of a docking device 500 includes a roof plate W6 and a bottom plate W5 being assembled to each other, the lever 510, the button 520, the locking member 530, the guide rod 560 disposed therein and the base A3 are all similar to the embodiments described above, and the lever 510 also being pushed by the button 520 so as to drive the locking member 530 up and down, such that the locking member 530 being locked with the portable electronic device (not shown here) while being protruded out of the roof plate.

The difference between the embodiments here and above is that the guide rod 560 passing through the opening 532 is divided into two rod portions 562, 564 disposed at the bottom plate W5 and the roof plate W6 respectively. Furthermore, the base A3 includes a plurality of guide ribs 570, 580, 590 surrounding the locking member 530, and each of the guide ribs 570, 580, 590 slidably leaning against the locking member 530. Besides, each of the guide ribs 570, 580, 590 is divided into two rib portions 572, 574, 582, 584, 582, 594 disposed at the bottom plate and a roof plate of the base respectively.

Moreover, referring to FIGS. 10 and 11, the rod portion 564 of the roof plate W6 tapered off away from the roof plate W6, and the rod portion 562 of the bottom plate W5 tapered off away from the bottom plate W5. Each of the rib portions 574, 584, 594 of the roof plate W6 tapered off away from the roof plate W6, and each of the rib portions 572, 582, 592 of the bottom plate w5 tapered off away from the bottom plate W5. Therefore, less friction is occurred when the locking member 530 moves along the guide rod 560 and the guide ribs 570, 580, 590, such that the production life is increased and assembling malposition could be voided.

In the embodiment, the docking device 500 further comprises locking protrusions 540 disposed at the roof plate W6 of the base A3, and the locking member 530 having locking holes 534 corresponding to the locking protrusion 540, wherein the locking protrusions 540 tapered off away from the roof plate W6, such that when the locking member 530 is extruded out of the base A3 via the lever 510, the locking member 530 is substantially locked with the roof plate via the locking protrusions 540 being interfered with the he locking holes 534. Therefore, the locking member 530 is secured with the portable electronic device in a more stable state.

To summarize, in the docking device of above described embodiments, the lever disposed in the base is used as the transfer mechanism for the button and the locking member in order to allow one of the button and the locking member to be movably extruded out of the base or be hidden in the base. As a result, when the portable electronic device is used to be docked on the docking device by its weight and force generated from the user, the button is pressed via the weight and the force, such that the locking member is further extruded out of the base via the lever to be inserted into the slot and locked with the portable electronic device. And when the portable electronic device is removed from the docking device, the locking member is pulled back into the base via the spring disposed in the base, such that the state of the docking device is reverted to the previous state of having only the button being extruded out of the base. Accordingly, the hidden locking member provides the docking device with aesthetic effect in appearance, and is not easily damaged for being extruded and from blunt force.

It will be apparent to those skilled in the art that various modifications and variations can be made to the structure of the invention without departing from the scope or spirit of the invention. In view of the foregoing, it is intended that the invention cover modifications and variations of the invention provided they fall within the scope of the following claims and their equivalents.

What is claimed is:

1. A docking device used for attaching a portable electronic device thereon, the docking device comprising:
   a base;
   a lever, pivoted in the base and having a first end and a second end opposite to each other;
   a button, movably disposed in the base and extruded out or hidden in the base; and
   a locking member, movably disposed in the base and extruded out of or hidden in the base, wherein the button is located on a moving path of the first end, and the locking member is located on a moving path of the second end, and when the portable electronic device is assembled to the docking device, the portable electronic device presses the button into the base to drive the first end, such that the second end drives the locking member out of the base to assemble with the portable electronic device.

2. The docking device of claim 1, wherein the base comprises:
a bottom plate;
a first stand, disposed upright at the bottom plate, wherein the lever is pivoted in the first stand, such that the first stand is disposed between the first end and the second end of the lever;
at least one guide rod disposed upright at the bottom plate, wherein the locking member is slidably set on the guide rod, the locking member bears on the second end of the lever, and the button bears on the first end of the lever.

3. The docking device as claimed in claim 2, the base having a plurality of guide rods, and the docking device further comprising:
a spring sleeved on one of the guide rods and propped between the locking member and a roof plate of the base, wherein the locking member and the button are respectively capable of being extruded or being merged into the roof plate, and the spring constantly drives the locking member to merge into the roof plate.

4. The docking device as claimed in claim 3, wherein the base further comprises a second stand assembled below the roof plate and a magnetic member disposed on the second stand, and when the portable electronic device is assembled to the docking device, the magnetic member is magnetically attracted to a side portion of the portable electronic device.

5. The docking device as claimed in claim 1, wherein the locking member comprises a hollow portion and an elastic arm located in the hollow portion, and when the portable electronic device is assembled to the docking device, the locking member reaches into a slot of the portable electronic device such that the elastic arm and the slot interfere with each other.

6. The docking device as claimed in claim 1, wherein in the lever, a first scale exists between a lever arm of the first end relative to the lever fulcrum and another lever arm of the second end relative to the lever fulcrum, and a second scale exists between a distance of the button reaching out of the base and another distance of the locking member reaching out of the base, and the first scale matches the second scale.

7. The docking device as claimed in claim 1, wherein the locking member comprises a pair of locking recesses on sides, and when the portable electronic device is assembled to the docking device, the locking member reaches into a slot of the portable electronic device and the pair of locking recesses are locked to a pair of elastic arms disposed in the slot of the portable electronic device.

8. The docking device as claimed in claim 2, wherein the guide rod is divided into two rod portions disposed at the bottom plate and a roof plate of the base respectively,
wherein the rod portion of the roof plate tapered off away from the roof plate, and the rod portion of the bottom plate tapered off away from the bottom plate.

9. The docking device as claimed in claim 2, wherein the base further comprises:
a plurality of guide ribs surrounding the locking member, and each of the guide ribs slidably leaning against the locking member.

10. The docking device as claimed in claim 9, wherein each of the guide ribs is divided into two rib portions disposed at the bottom plate and a roof plate of the base respectively,
wherein each of the rib portions of the roof plate tapered off away from the roof plate, and each of the rib portions of the bottom plate tapered off away from the bottom plate.

11. The docking device as claimed in claim 2, wherein the base further comprises a roof plate opposite to the bottom plate, and the docking device further comprises:
at least one locking protrusion disposed at the roof plate of the base, and the locking member having at least one locking hole corresponding to the locking protrusion,
wherein when the locking member is extruded out of the base, the locking protrusion is locked with the locking hole in an interference manner.

12. The docking device as claimed in claim 11, wherein the locking protrusion tapered off away from the roof plate.

* * * * *